United States Patent
Yan et al.

(10) Patent No.: US 8,516,220 B2
(45) Date of Patent: Aug. 20, 2013

(54) RECORDING DIRTY INFORMATION IN SOFTWARE DISTRIBUTED SHARED MEMORY SYSTEMS

(75) Inventors: Shoumeng Yan, Beijing (CN); Ying Gao, Beijing (CN); Xiaocheng Zhou, Beijing (CN); Hu Chen, Beijing (CN); Sai Luo, Beijing (CN); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 13/000,085

(22) PCT Filed: May 11, 2010

(86) PCT No.: PCT/CN2010/000670
§ 371 (c)(1),
(2), (4) Date: Dec. 20, 2010

(87) PCT Pub. No.: WO2011/140673
PCT Pub. Date: Nov. 17, 2011

(65) Prior Publication Data
US 2012/0023296 A1  Jan. 26, 2012

(51) Int. Cl.
*G06F 12/08* (2006.01)
*G06F 12/00* (2006.01)

(52) U.S. Cl.
USPC ........... 711/205; 711/206; 711/207; 711/148; 711/147; 711/E12.001

(58) Field of Classification Search
USPC ................. 711/147, E12.001, 205, 206, 207, 711/148
See application file for complete search history.

(56) References Cited

U.S. PATENT DOCUMENTS

| | | | | |
|---|---|---|---|---|
| 5,633,813 | A * | 5/1997 | Srinivasan | 703/14 |
| 6,049,853 | A * | 4/2000 | Kingsbury et al. | 711/147 |
| 6,105,113 | A * | 8/2000 | Schimmel | 711/146 |
| 6,684,305 | B1 * | 1/2004 | Deneau | 711/159 |
| 7,774,645 | B1 * | 8/2010 | Clark et al. | 714/12 |
| 7,886,127 | B2 * | 2/2011 | Chen et al. | 711/206 |
| 8,127,174 | B1 * | 2/2012 | Shah et al. | 714/13 |
| 8,364,851 | B2 * | 1/2013 | Kessler et al. | 710/1 |
| 2006/0075085 | A1 * | 4/2006 | Borg | 709/224 |
| 2006/0117300 | A1 * | 6/2006 | Puthukattukaran et al. | 717/124 |
| 2009/0106524 | A1 * | 4/2009 | Chen et al. | 711/206 |
| 2009/0164715 | A1 * | 6/2009 | Astigarraga et al. | 711/112 |

OTHER PUBLICATIONS

TLB Consistency on Highly-Parallel Shared-Memory Multiprocessors; Teller et al; Oct. 1987.*

* cited by examiner

*Primary Examiner* — Mardochee Chery
(74) *Attorney, Agent, or Firm* — Trop, Pruner & Hu, P.C.

(57) ABSTRACT

A page table entry dirty bit system may be utilized to record dirty information for a software distributed shared memory system. In some embodiments, this may improve performance without substantially increasing overhead because the dirty bit recording system is already available in certain processors. By providing extra bits, coherence can be obtained with respect to all the other uses of the existing page table entry dirty bits.

20 Claims, 2 Drawing Sheets

RECORDING DIRTY INFORMATION IN SOFTWARE DISTRIBUTED SHARED MEMORY SYSTEMS

BACKGROUND

This relates generally to software distributed shared memory systems.

In a distributed shared memory (DSM) system, each node in a cluster has access to shared memory in addition to access to each node's non-shared private memory. A software DSM (SDSM) may be implemented in the operating system or as a programming library. If implemented in the programming library, it is accessible to developers, but if it is implemented in the operating system, it is not accessible to developers.

Some SDSM systems rely on page faults for a number of things, including dirty recording. Dirty recording is a mechanism to precisely know which data has been modified and is, therefore, "dirty" since the last data synchronization. Dirty recording may be useful in reducing the amount of coherence data that must be transferred. The SDSM system protects the memory from being written and, thus, enforces subsequent writes to fault in a handler in which the precise dirty information is recorded.

However, a page fault, together with memory protection, are time consuming operations that can lead to lower performance dirty recording. Page faults may take up a relatively large ratio of the shared memory runtime overhead.

DETAILED DESCRIPTION

Figure 1:
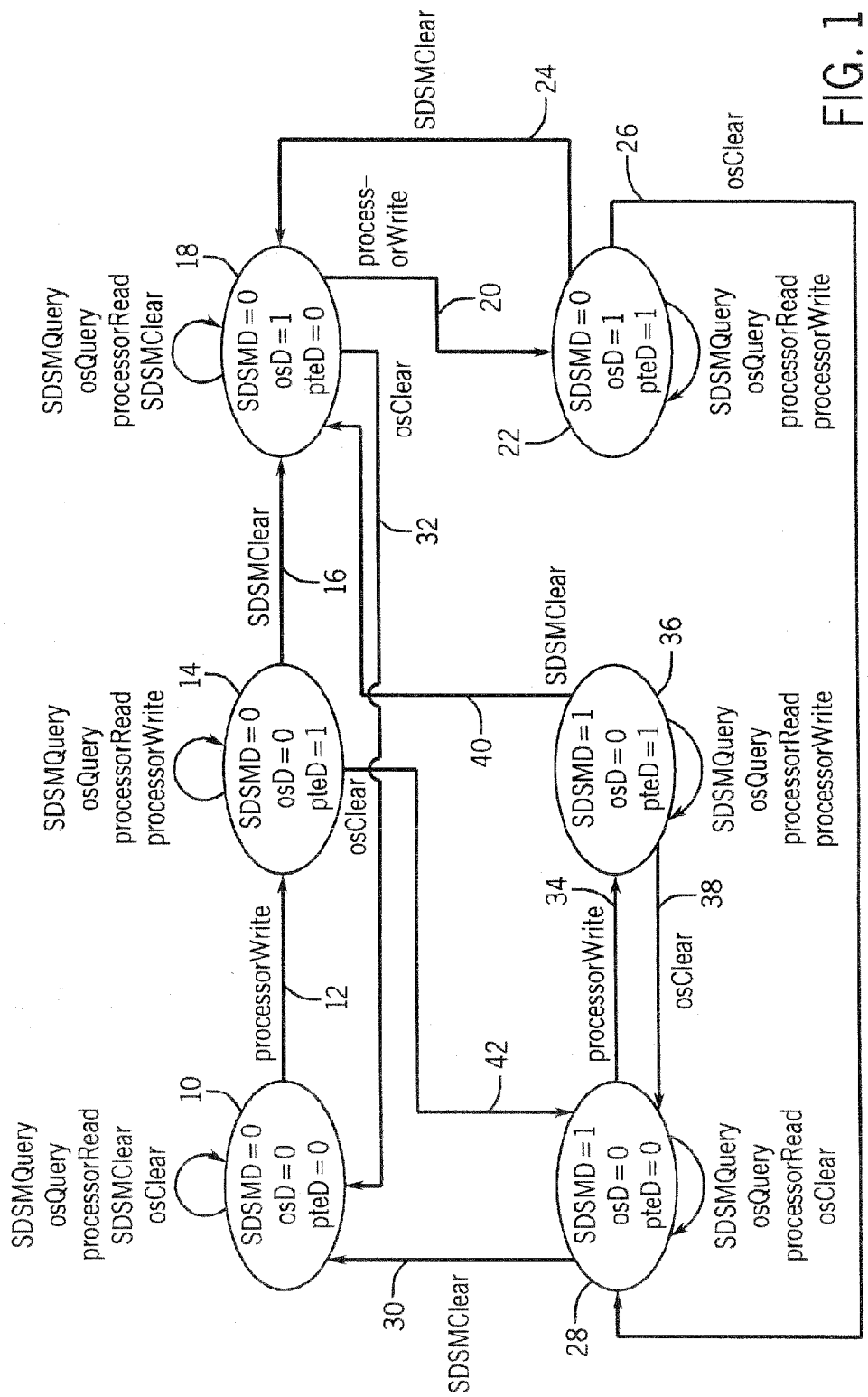
FIG. 1 is a flow chart for one embodiment of the present invention.

In some embodiments, the existing page table entry dirty bit recording system that is already available on some processors, including X86 processors manufactured by Intel Corporation, Santa Clara, Calif., can be used as the dirty recording system in a software distributed shared memory. Because this recording system already exists, it may be used for dirty recording with relatively low overhead in some embodiments. Moreover, it can improve the performance in shared memory systems that have an accessible X86 processor in some embodiments. Thus, a programmability advantage may be achieved without compromising performance, in some embodiments.

In one embodiment, the shared memory system may be implemented between an X86 processor and a graphics processing unit. However, the present invention is not limited to this specific embodiment.

In X86 processors, there is a dirty bit bookkeeping system in the page table entry for every page in the page memory. The X86 processor automatically sets the dirty bit in the page table entry if the relevant page is modified for the first time. The clearing of the bit is not handled by the processor, but, instead, is the responsibility of system software.

In accordance with some embodiments of the present invention, the bit clearing is handled differently than in conventional applications of dirty bit bookkeeping. The page table dirty bit recording mechanism can be used to provide system software, and especially a memory management module of an operating system, with the ability to identify which page is more suitable to be paged out and whether a write back is necessary when paging out a page. Because this system is implemented in hardware, it may be a more efficient dirty recording mechanism than relying on page faults.

In one embodiment, the page table entry dirty bit is queried to know whether a page is modified. The page table entry dirty bit may be cleared to indicate that the page has been synchronized across nodes in the SDSM. For example, one node may be an X86 processor and the other node may be a graphics processor. Then, a page fault need not be used for dirty recording in some embodiments.

A problem arises that at runtime more than one agent would be manipulating the page table entry dirty bit for different reasons. The operating system memory module queries the page table entry dirty bit on its page replacement decision and clears it, for example, on a fresh loading from a secondary storage to memory.

By providing two extra bits for every virtual shared memory page, it is possible to use the page table entry dirty bits for this additional function of dirty recording for an SDSM system without interfering with the operation of the dirty bit used in the page table entry.

In one embodiment, two extra bits are provided for every virtual system memory page. One extra bit being "SDSM dirty" and the other being "operating system (OS) dirty." Together with the hardware supported page table entry dirty bit ("PTE dirty") there are three bits in the system per virtual shared memory page.

Of course, while the present description talks about setting bits, the same thing can be done by setting flags. Thus, the term "setting bits" herein includes setting flags, as well.

Embodiments of the invention provide a programming model for combined general purpose and graphics processor platforms, including integrated or discrete devices, multiple graphics processing cards, and hybrid graphics processing systems. Additionally, embodiments of the invention provide a shared memory model between the general purpose and graphics processors. Instead of sharing the entire virtual address space, only a part of the virtual address space may be shared in one embodiment.

Data structures may be shared between the processors and pointers may be passed from one side to the other without requiring any marshalling (i.e. back and forth serializing). For example, in one embodiment a game engine may includes physics, artificial intelligence (AI), and rendering. The physics and AI code may be best executed on the general purpose processors, while the rendering may be best executed on the graphics processor. Data structures may need to be shared between processors, such as the scene graph. However, in embodiments of the shared memory model, the scene graph may simply reside in shared memory and be accessed by both processors.

In one embodiment, the full programming environment, including the language and runtime support, is implemented. A number of highly parallel non-graphics workloads may be ported to this environment. The implementation may work on heterogeneous operating systems, i.e. with different operating systems running on each processor. Moreover, user level communication may be allowed between processors.

In one embodiment, the memory model provides a window of shared virtual addresses between the processors, such as in partitioned global address space (PGAS) languages. Any data structure that is shared between the processors typically may be allocated by the programmer in this space. The system may provide a special malloc function that allocates data in this space. Static variables may be annotated with a type quantifier to have them allocated in the shared window. However, unlike PGAS languages there is no notion of affinity in the shared window. This is because data in the shared space migrates between the processor caches as it gets used by each processor. Also unlike PGAS implementations, the representation of pointers does not change between the shared and private spaces. The remaining virtual address space is private to the processors. By default data gets allocated in this space 130, and is not visible to the other side. This partitioned address space approach may cut down on the amount of memory that needs to be kept coherent and enables a more efficient implementation for discrete devices.

The embodiment of the memory model may be extended to multi-graphics processing and hybrid configurations. In particular, the window of shared virtual addresses may be extended across all the devices. Any data structures allocated in this shared address window may be visible to all agents and pointers in this space may be freely exchanged. In addition, every agent has its own private memory.

Embodiments of the shared memory model may be augmented with ownership rights to enable further coherence optimizations. Within the shared virtual address window, either processor may specify that it owns a particular chunk of addresses. If an address range in the shared window is owned by the general purpose processor, then the general purpose processor knows that the graphics processor cannot access those addresses and hence does not need to maintain coherence of those addresses with the graphics processor. The same is true of graphics processor owned addresses.

In one embodiment, shared data may be privatized by copying from shared space to the private space. Non-pointer containing data structures may be privatized simply by copying the memory contents. While copying pointer containing data structures, pointers into shared data must be converted to pointers into private data.

Private data may be globalized by copying from the private space to the shared space and made visible to other computations. Non-pointer containing data structures may be globalized simply by copying the memory contents. While copying pointer containing data structures, pointers into private data must be converted as pointers into shared data (converse of the privatization example).

In one embodiment, the compiler generates two binaries—one for execution on each processor. Two different executables are generated since the two operating systems may have different executable formats. The graphics binary contains the code that will execute on the graphics processor, while the general purpose binary contains the general purpose processor functions. The runtime library has components for each processor which is linked with application binaries for each processor to create executables for each processor. When the general purpose binary starts executing, it calls a runtime function that loads the graphics executable. Both binaries create a daemon thread that is used for interprocessor communication.

In one embodiment, each processor may have different page tables and different virtual to physical memory translations. Thus, to sync up the contents of virtual address V between the processors (e.g. at a release point), the contents of different physical addresses are synched up. The general purpose processor, however, may not have access to the graphics page tables and the graphics processor may not have access to the general purpose page tables.

During initialization, a portion of the bus aperture space may be mapped into the user space of the application and instantiated with a task queue, a message queue, and copy buffers. When there is a need to copy pages, for example, from the general purpose to the graphics processor, the runtime copies the pages into the bus aperture copy buffers and tags the buffers with the virtual address and the process identifier. On the graphics side, the daemon thread copies the contents of the buffers into its address space by using the virtual address tag. Thus, the copy may be performed in a two step process—the general purpose processor copies from its address space into a common buffer (bus aperture) that both processors may access, while the graphics processor picks up the pages from the common buffer into its address space. Since the aperture is pinned memory, the contents of the aperture are not lost if a process gets context switched out. This allows the two processors to execute asynchronously which may be critical since the two processors may have different operating systems and hence the context switches may not be synchronized. Furthermore, the aperture space may be mapped into the user space of the applications thus enabling user level interprocessor communication. This makes the application stack vastly more efficient than going through the OS driver stack.

When the graphics processor performs an acquire operation, the corresponding pages may be set to no-access on the graphics processor. At a subsequent read operation the page fault handler on the graphics processor copies the page from the general purpose processor if the page has been updated and released by the general purpose processor since the last graphics processor acquire. The directory and private version numbers may be used to determine this. The page is then set to read-only. At a subsequent write operation the page fault handler creates the backup copy of the page, marks the page as read-write and increments the local version number of the page. At a release point, a diff is performed with the backup copy of the page and the changes transmitted to the home location, while incrementing the directory version number. The diff operation computes the differences in the memory locations between the two pages (i.e. the page and its backup) to find out the changes that have been made. The general purpose processor operations are done in a symmetrical way. Thus, between acquire and release points the processors operate out of their local memory and caches and communicate with each other only at the explicit synchronization points.

At startup the implementation decides the address range that will be shared between the processors, and makes sure that this address range always remains mapped (e.g. using mmap on Linux). This address range may grow dynamically, and does not have to be contiguous, though in a 64 bit address space the runtime system may reserve a continuous chunk upfront.

Referring to FIG. 1, an algorithm starts with a page that is initially clean, meaning that all three bits (SDSMD, osD and pteD) are zero, as indicated in state 10 in FIG. 1. Here, there may be an SDSM query, an operating system (OS) query, a processor read, an SDSM clear, and an OS clear, that do not change any of the three bits, and do not represent any state change. An X86 processor write 12 automatically sets the PTE dirty bit (pteD), as shown in state 14, as the PTE dirty bit transitions from zero to one.

When the operating system clears the PTE dirty bit, it first backs up the PTE dirty bit into the SDSM dirty bit (SDSMD) and then actually clears the PTE dirty bit and the operating system dirty bit (osD). This is shown at operation 42, which is the operating system clear. In this case, the PTE dirty bit becomes zero, the operating system dirty bit stays zero, and SDSM dirty bit becomes one, to preserve the dirty bit status for the SDSM system. When the operating system queries the dirty bit, it reads a logical OR of PTE dirty and operating system dirty bits. When the SDSM runtime clears the dirty bit, it first backs up the PTE dirty bit into the operating system dirty bit and then actually clears the PTE dirty and SDSM dirty bits, as indicated by operation 16 and state 18.

When the SDSM runtime queries the dirty bit, it reads a logical OR of the PTE dirty bit and the SDSM dirty bit. The extra dirty bit backups guarantee that when one agent is updating a dirty bit, the dirty information is not lost for the other agents. For example, even if the SDSM system has cleared the PTE dirty and SDSM dirty bits, the operating system actually has the dirty information preserved in its operating system dirty bit. The use of the logical OR operation guarantees any agent can see the complete dirty information from its own perspective. For example, even if the SDSM system has cleared the PTE dirty and the SDSM dirty bits, the operating system can still see what it should see with the logical OR of the PTE dirty and operating system dirty bits.

From state 18, a processor write 20 transitions to state 22 using the same techniques. An SDSM clear 24 transitions to the state 18. From the state 22, an operating system clear 26 transitions to state 28. From state 28, a processor write 34 transitions to state 36. An operating system clear 38 transitions back to state 28. From state 36, an SDSM clear 40 transitions to state 18. From state 18, an operating system clear 32 transitions to state 10. From state 28, an SDSM clear 30 transitions back to state 10 as well.

Besides maintaining the dirty bits, the operating system may have system calls to expose the query/clear services to SDSM runtime. The query system call takes a virtual shared memory address as an input and returns a Boolean value to indicate whether the page is dirty or not. The clear system call takes the virtual shared memory address as its input. The SDSM runtime calls the query system call to know whether a page has been modified since the last synchronization and only synchronizes in case of a dirty page. The SDSM runtime calls a clear system call after synchronization.

In some embodiments, the system calls may take an address range as an input to reduce system call overhead. In such case, the query system call may return a bit map to indicate which pages in the address range are dirty from the point of view of the SDSM runtime.

In one embodiment, the extra bits can be stored in a separate table associated with kernel data structure for a memory page. In the case of an X86 processor architecture containing unused bits in the page table entry, these two extra bits can be two unused bits. In multiprocessor/multi-core systems, the dirty bit clear operation also needs to do a translation lookaside buffer (TLB) invalidation and shootdown properly.

As an alternative embodiment, it is also feasible to lock the SDSM virtual shared memory pages to be non-pageable because the operating system only clears the dirty bits on memory paging operations. This makes the SDSM runtime the only one agent that can clear dirty bits. After a data synchronization between nodes in the SDSM, the relevant pages are changed to clean state. Then if a page is modified, it can be tagged as dirty. Then, for the next data synchronization, SDSM runtime just queries the dirty bit of every page and only synchronizes the pages with the dirty bit set. After that, the SDSM runtime simply clears the page table entry dirty bit of the pages that are dirty.

Figure 2:
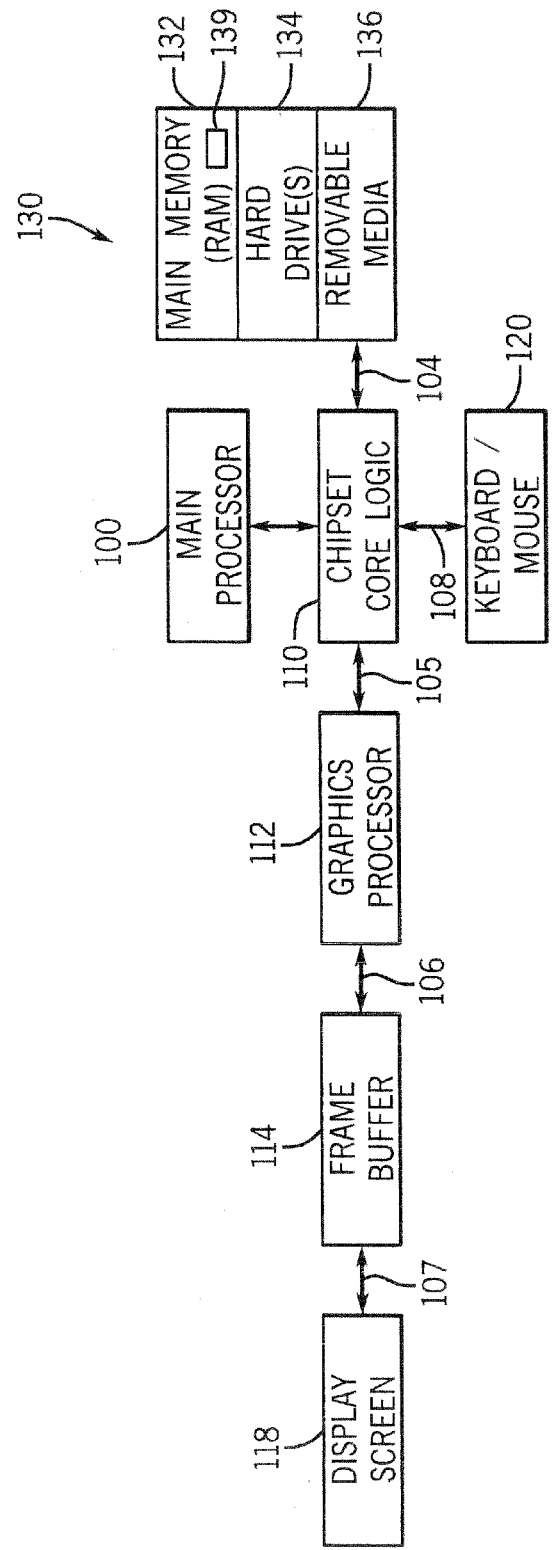
FIG. 2 is a schematic depiction for one embodiment of the present invention.

The computer system 130, shown in FIG. 2, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or general purpose processor 100 in one embodiment. The general purpose processor 100 may be an X86 processor or any processor with a page table entry dirty bit recording system. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    using a page table entry dirty bit recording system for dirty recording in a software distributed shared memory system, using a first bit to indicate that a page table entry is dirty;
    providing a first extra bit for a virtual shared memory page to keep track of whether data is dirty for the software distributed shared memory system; and
    providing a second extra bit for the virtual shared memory page to keep track of whether data is dirty for an operating system.

2. The method of claim 1 including providing hardware based dirty recording.

3. The method of claim 1 including implementing a software distributed shared memory system where one node is a graphics processor and another node is a general purpose processor.

4. The method of claim 3 including using a general purpose processor with a page table entry dirty bit recording system.

5. The method of claim 1 including preserving a state of the extra bit for the software distributed shared memory system when the page table entry dirty bit is cleared.

6. The method of claim 5 including preserving a state of the extra bit for the operating system when the page table entry dirty bit is cleared.

7. The method of claim 1 including using a logical OR of two bits to query a dirty bit.

8. A non-transitory computer readable medium storing instructions executed by a processor to:
    use a page table entry dirty bit for dirty recording in a node in a software distributed shared memory system by using first bit to indicate that a page table entry is dirty;
    provide a first extra bit for a virtual shared memory page to keep track of whether data is dirty for the software distributed shared memory system; and provide a second extra bit for the virtual shared memory page to keep track of whether data is dirty for an operating system.

9. The medium of claim 8 further storing instructions to implement a software distributed shared memory system where one node is a graphics processor and another node is a general purpose processor.

10. The medium of claim 8 further storing instructions to preserve a state of the extra bit for the software distributed shared memory system when a page table entry dirty bit is cleared.

11. The medium of claim 10 further storing instructions to preserve a state of the extra bit for the operating system when the page table entry bit is cleared.

12. The medium of claim 8 further storing instructions to use a logic OR of two bits to query a dirty bit.

13. The medium of claim 8 further storing instructions to lock virtual shared memory pages of a software distributed shared memory system to be non-pageable.

14. The medium of claim 13 further storing instructions to change pages to a clean state after a synchronization between nodes of the software distributed shared memory system.

15. A system comprising:
a graphics processor;
a general purpose processor coupled to said graphics processor, said general purpose processor and graphics processor configured as nodes in a software distributed shared memory system, said general purpose processor to use a page table entry dirty bit recording system for dirty recording in said software distributed shared memory system using a first bit to indicate that a page table entry is dirty, a first extra bit to keep track of whether data is dirty for the software distributed shared memory system, and a second extra bit to keep track of whether data is dirty for an operating system.

16. The system of claim 15, said general purpose processor to preserve a state of the extra bit for the software distributed shared memory system when the page table entry dirty bit is cleared.

17. The system of claim 16, said general purpose processor to preserve a state of the extra bit for the operating system when the page table entry dirty bit is cleared.

18. The system of claim 16, said general purpose processor to use a logical OR of two bits to query a dirty bit.

19. The system of claim 15, said general purpose processor storing virtual shared memory pages of the software distributed shared memory system that are locked to be non-pageable.

20. The system of claim 19, said general purpose processor to change pages to a clean state after synchronization between nodes of the software distributed shared memory system.

* * * * *